United States Patent [19]
Guimbal

[11] 3,802,349
[45] Apr. 9, 1974

[54] LINEAR MOTOR FOR GUIDED TRANSPORT - INSTALLATION

[76] Inventor: Jean C. Guimbal, 50 bis, rue Henri Deschaud, 42-Saint-Etienne, France

[22] Filed: Aug. 17, 1971

[21] Appl. No.: 172,393

[30] Foreign Application Priority Data
Aug. 26, 1970 France .............................. 70.31994

[52] U.S. Cl. ............. 104/148 LM, 310/13, 318/135
[51] Int. Cl. ........................ H02k 41/04, B60l 9/00
[58] Field of Search ......... 104/148 LM; 310/12, 13; 318/135, 224 R

[56] References Cited
UNITED STATES PATENTS

| | | | |
|---|---|---|---|
| 3,622,818 | 11/1971 | Payen | 310/13 |
| 2,400,979 | 5/1946 | Curry et al. | 318/224 R |
| 3,332,361 | 7/1967 | Bertin et al. | 104/120 |
| 3,644,762 | 2/1972 | Eastham | 310/13 |
| 2,404,984 | 7/1946 | Powers | 104/148 LM |

FOREIGN PATENTS OR APPLICATIONS

| | | | |
|---|---|---|---|
| 434,186 | 4/1948 | Italy | 104/148 LM |

*Primary Examiner*—Gerald M. Forlenza
*Assistant Examiner*—George H. Libman
*Attorney, Agent, or Firm*—Robert E. Burns; Emmanuel J. Lobato

[57] ABSTRACT

A linear motor for a guided transport installation, notably public transportation systems on rail, which comprises a fixed field member or inductor carried by the track and a armature member carried by the vehicle or vehicles. It is characterized in that the inductor consists of a cylindrical or prismatic magnetic core surrounded by annular coils of same section connected to the phases of a multiphase wiring system in order to yield a sliding field driving the vehicle or vehicles, and that the armature consists of a sleeve having a U-shaped or substantially U-shaped cross-section which surrounds the inductor and comprises throughout its length an aperture permitting the passage of the device fastening the inductor in position, this armature consisting of a flux return yoke of U-shaped or substantially U-shaped cross-section, provided on its inner surface with a conductive layer adapted to become the seat of induced currents, said layer being thicker on the aperture side to enable these currents to close the loop from pole to pole.

15 Claims, 6 Drawing Figures

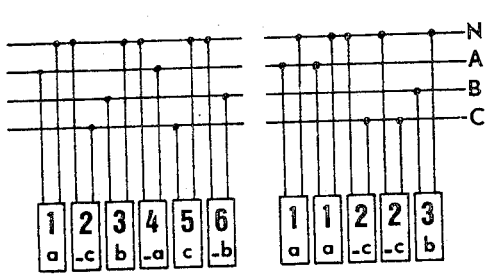
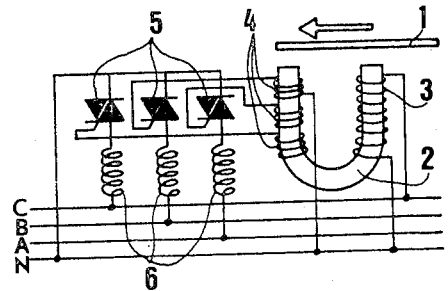
Fig 1   Fig 2   Fig 3
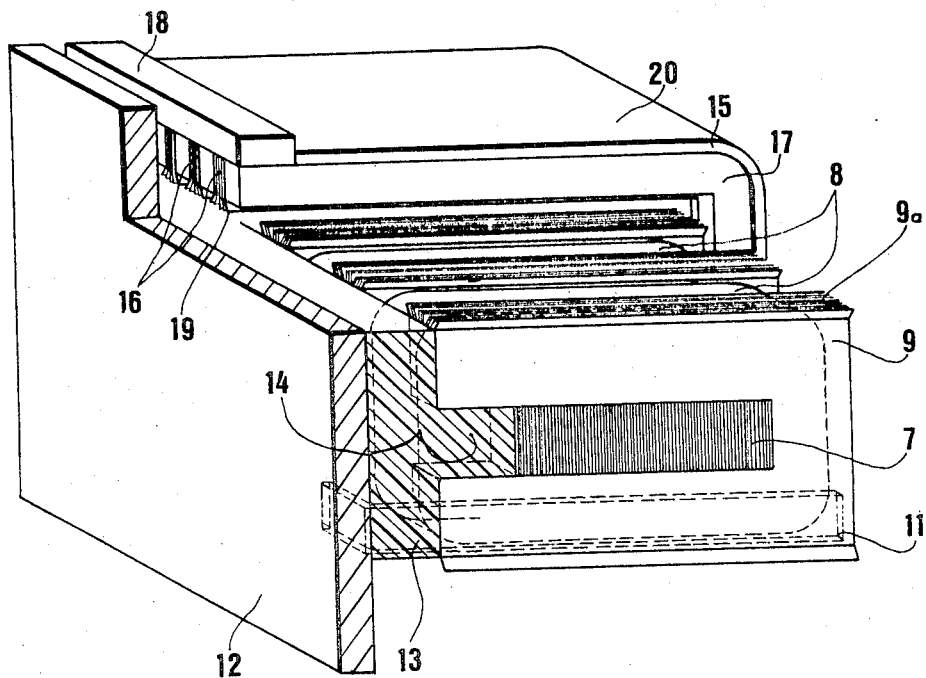
Fig 4

LINEAR MOTOR FOR GUIDED TRANSPORT - INSTALLATION

BACKGROUND OF THE INVENTION

The present invention relates to a linear motor for a guided transport installation, notably for public transportation systems on rails and more particularly a linear motor disposed along a track for causing the translation of vehicles or trains of vehicles such as rolling stock circulating on this track.

In known devices of this character the driving effort is due to the currents induced in conducting blades carried by the vehicles and disposed either between a pair of notched yokes or between a notched yoke and a flux return yoke, each notched yoke being constructed like that of a conventional rotary-field machine but developed in rectilinear fashion instead of surrounding the rotor. A well-known inconvenience of these systems is that instead of providing each vehicle with the necessary power output the latter is available in each track section of a length equal to that of the conducting blade or blades of each vehicle or train of vehicles. Under these conditions the installation is rather expensive. Moreover, to obtain accelerations or braking effects, the winding pitch must be varied; therefore, the requirement to be met consists in providing as many winding types as the number of speeds contemplated.

SUMMARY OF THE INVENTION

It is the chief object of the present invention to avoid these inconveniences by providing a linear motor constituting a particularly economical electromagnetic system adapted to be embodied by utilizing exactly identical elements irrespective of the speed contemplated for each of them; besides, a same element may give several speeds by simply modifying its electrical connections or couplings alone.

To this end, the present invention provides a linear motor for a guided transport installation, notably public transportation systems on rail, which comprises a fixed field member or inductor or winding carried by guide means such as the track by mounting means and an armature member carried by the vehicle or vehicles by means mounting same, characterized in that said inductor consists of a cylindrical or prismatic magnetic core surrounded by annular coils of same section connected to the phases of a multiphase wiring system in order to yield a sliding field driving the vehicle or vehicles, and that the armature consists of a sleeve having a U-shaped or substantially U-shaped cross-section which surrounds the inductor and comprises throughout its length an aperture permitting the passage of the device for fastening the inductor in position, this armature consisting of a flux return yoke of U-shaped or substantially U-shaped cross-section, provided on its inner surface with a conductive layer adapted to become the seat of induced currents, said layer being thicker on the aperture side to enable these currents to close the loop from pole to pole.

The speed of the sliding field produced by the inductor is porportional to the number of successive windings connected to a same phase. After each station where the vehicles are to be stopped, the inductor elements disposed along the track are characterized by an increasingly faster sliding field, and before each station these inductor elements are characterized by an increasingly slower sliding field. Thus, except for minor slip variations, all the vehicles equipped with an armature responsive to said sliding field travel at a speed which is determined by construction for each point of the track. The successive inductor elements are energized through a cut-off system provided with a member responsive to the presence of the vehicle or vehicles.

The inductor is carried by a vertical conducting metal plate registering with the aperture of the aforesaid U-shaped armature, which becomes the seat of induced currents forming the images of portions of the armature and inductor current sheets which, due to the presence of said aperture of the U-shaped sleeve, cannot constitute the images of each other.

Annular plates slotted to prevent the circulation of induced currents are disposed between the windings, the slots being adapted to be widened up to the size conducive to a U-shape, and the armature consists of alternate conductors and magnetic metal blades, whereby the magnetic gap is limited to the play consistent with the desired guiding precision.

According to another feature characterizing this invention, the armature is mounted by means to thereby slide in relation to the vehicle and comprises on the one hand damping means for damping out shocks and jolts likely to develop on account of the discontinuous nature of the inductor, and on the other hand brake means including control means for actuating an emergency brake operating somewhat like the safety brakes of lifts or elevators.

BRIEF DESCRIPTION OF THE DRAWING

The invention will now be described in detail with reference to the accompanying drawing illustrating diagrammatically by way of example a typical form of embodiment thereof. In the drawing:

FIG. 1 is a wiring diagram showing a field coil mounting wherein only one coil is connected to each phase;

FIG. 2 is a wiring diagram showing a modified field coil mounting wherein two successive coils are connected to each phase;

FIG. 3 is a wiring diagram showing a device for controlling the energization of the field coils;

FIG. 4 is a perspective, part-sectional view, of the inductor and armature of a linear motor constructed according to the teachings of this invention;

DESCRIPTION OF THE PREFERRED EMBODIMENT

Figure 5:
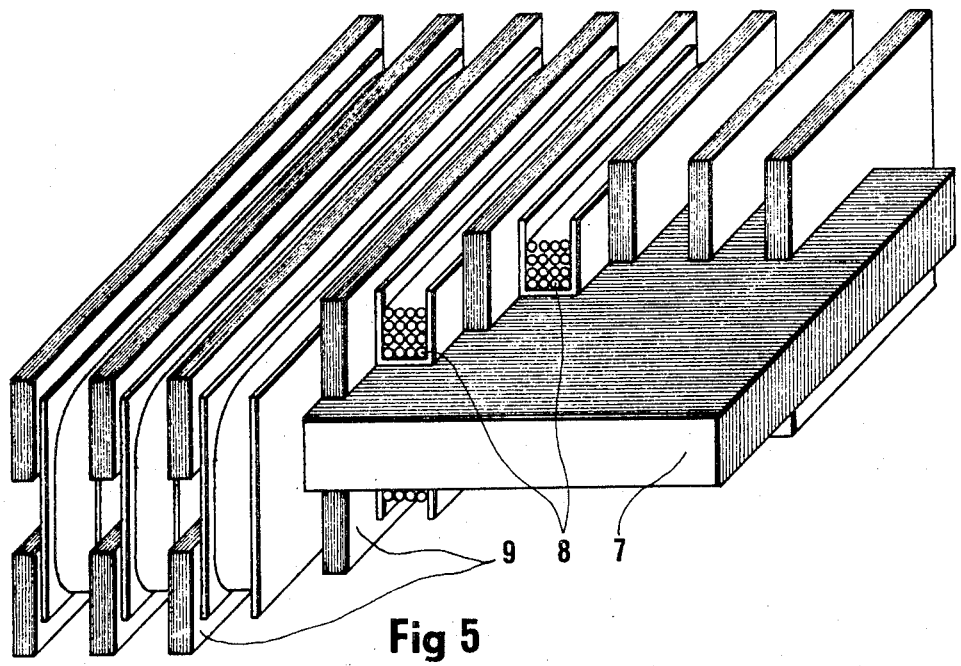
FIG. 5 is a perspective, sectional view inductor core and the coils and stacked plates.

Referring first to FIGS. 1 and 2, illustrating the mounting of inductor coils on the three phases A, B and C of a three-phase supply system, N being the neutral, FIG. 1 shows a number of successive coils, connected to each plate, which number is equal to one unit. There are three phases denoted A, B and C, but it is known that actually a three-phase supply system permits the obtaining of six currents phase displaced by $2\pi/6$ and corresponding to A, C reversed, which is designated by the term -C; B, A reversed, denoted -A, C and -B. The currents are fed to coils $a$, $-c$, $b$, $-a$, $c$ and $-b$, respectively, connected across A and N, N and C, B and N, N and A, C and N, N and B, these six successive coils covering one pair of poles of the inductor. With a 50-cycle current, the $2\pi/6$ phase displacement corresponds to a time period of $1/300^{th}$ of a second and if $d$ designates the distance measured between the median planes of a pair of successive coils, the field will slide in the above-defined inductor at a speed equal to $300 d/s$.

FIG. 2 corresponds to a pair of successive coils connected to each phase; in other words each pair of poles of the inductor comprises twelve successive coils, namely $a, a; -c, -c; b, b; -a, -a; c, c; -b, -b;$ these coils are connected as illustrated in FIG. 2. In this case, the fields sliding speed is equal to $600 d/s$. As a rule, with K successive coils connected to each phase, the sliding speed is $300 \times K \times d/s$. Fractional values of K may be obtained by taking first the lower integral, then the upper integral, the average giving the desired number.

Now a typical form of embodiment of a device for controlling the electrical energization of an inductor element will be described with reference to FIG. 3. This device comprises a steel strip 1 carried by the vehicle travelling on the track. For each inductor element there is provided a U-shaped magnetic circuit 2, said steel strip 1 moving past the two arms of the U. One branch of this circuit 2 carries a winding 3 connected between one phase, for instance phase C, and the neutral N.

The other branch of circuit 2 carries three windings connected on the one hand in common to the neutral N and on the other hand, separately, to the triggers of three triacs 5. On the other hand, these triacs 5 are connected in series with three windings 6, respectively, connected to the three phases A, B and C, these three windings corresponding to the inductor coil assembly incorporated in a same element.

Thus, when the steel strip 1 carried by the vehicle moves past the U-shaped magnetic circuit 2, the flux created by coil 3 flows through the coils 4 and the current induced therein releases the triacs 5 permitting the passage of current through the windings 6 of the corresponding inductor element. It is well that a conductive element be energized only when it is covered completely by an armature; therefore, at either end the metal strip 1 should be shorter than the armature by one half-length of the inductor element.

If a single track is contemplated, with crossing loops at the line stations, beyond the switches the same inductor elements are used for re-starting a vehicle pulling out from the station and braking the pulling-in vehicle. A mere three-phase system would require two sets of triacs in this specific case, i.e., one per field sliding, and a logic system for releasing one or the other set according to the direction of travel of the vehicle. This difficulty is eliminated with the single-pulse elements which, with the same coupling, permit the operation in either direction. It is known that they do not permit the initial phase of the starting, but this phase takes place before the switches, by using three-phase elements.

Now reference will be made to FIG. 4 and FIG. 5 to describe a typical form of embodiment of the inductor and armature of the linear motor according to this invention. The fixed inductor 10 comprises a core 7 consisting of a stacking of magnetic sheet strips having therefore a prismatic configuration with a rectangular cross-sectional contour, the major sides being disposed horizontally and the minor sides vertically.

Figure 6:
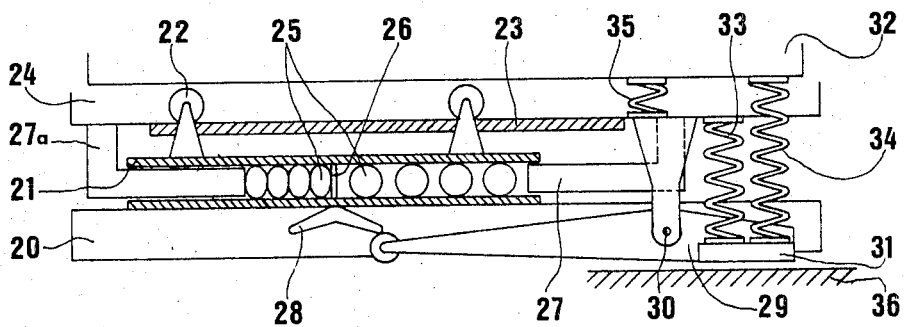
FIG. 6 is a diagrammatic vertical section illustrating the mounting of the armature on the frame or chassis of the vehicle.

This core as shown in FIGS. 4 and 6 is covered with alternate annular coils 8 and stacked U-shaped magnetic plates straddling the core 7. The horizontal edges 9a of these plates 9 comprise a narrow bent portion so that they are somewhat spaced from one another to facilitate the passage of magnetic flux in the gap. At spaced intervals aluminum sheets 11 are inserted into the stacked plates 9 in the empty space left by the narrower U-shaped plates, and their ends located adjacent the longitudinal vertical supporting plate 12 is bent to engage this supporting plate 12 to which they are secured. This supporting plate 12 registering with the aperture of the U-shaped plate stacking of armature 20 consists of aluminum and is relatively thick in order to compenste, without unduly high leaks, those portions of the armature and inductor current sheets that cannot compensate each other. With this arrangement the magnetic leaks are reduced and therefore on the one hand the efficiency is improved and on the other hand the maximum power output that can be derived from a given element is increased. The assembly comprising the coils 8 and the stacked plates 9 disposed therebetween is embedded in a molding 13 of thermosetting resin filling the gap between this assembly and the supporting plate 12, so as to fix the wiring connections 14 of coils 8.

The movable armature 20 consists of a sheet 15 having the shape of a U lying on one branch or horizontally and supporting on its inner surface, alternatively, U-shaped magnetic strips consisting of one or a plurality of pieces 16, and likewise U-shaped conductors 17 having their ends welded to a pair of longitudinal bars 18 covering the two lips of the aperture of this U-shaped structure, externally thereof. All these magnetic and conducting strips are shown as lying in planes perpendicular to the armature axis but in fact they may extend in a slightly oblique position in relation to these planes. The magnetic strips 16 project slightly from the conductors on the inner side; they comprise two layers and the horizontal edges 19 of these layers are caused to diverge slightly, for example by bending.

Along curved track sections the inductor 10 is shifted towards the aperture of the U-shaped armature 20, thus giving the clearance made necessary by the fact that the armature 20 is rectilinear or consists of rectilinear sections, without inasmuch increasing the gap along the major sides of the inductor and, therefore, without appreciably reducing the power output.

Now reference will be made to FIG. 6 illustrating the mounting permitting the sliding of the armature 20 in relation to the frame structure or chassis 24 of the vehicle, and also the damping out of the stress jolts and shocks, and the operation of the emergency brake. The armature 20 is rigid with a cylinder 21 rolling through rollers 22 on rails 23 carried by the chassis 24. A plurality of rubber balls 25 are contained within cylinder 21 and separated into two groups by disc 26. The balls in 25 are held in the cylinder by pistons 27 and 27a attached to the chassis 24.

The armature 20 carries a cam 28 having substantially the shape of an inverted V with an obtuse angle; this cam 28 is adapted to engage a roller follower carried by the free end of one arm of a two-armed lever 29 fulcrumed through a transverse horizontal pivot pin 30 to the chassis 24, the other arm of said lever 29 carrying a shoe 31. Between this shoe 31, on the one hand, the chassis 24 and body 34 of the vehicle, on the other hand, coil compression springs 33 and 34 are disposed. Other springs 35 are provided between the chassis 24 and the body 32. The shoe 31 is adapted frictionally to engage a suitable strip or member 36 secured to the track.

When the vehicle and therefore the armature 20 are inoperative or still, the cam 28 releases the lever 29, so that the shoe 31 is urged downwards by the springs 33 reacting against the chassis 24 and also by the springs 34 reacting against the body 32 of the vehicle, this body 32 being suspended from the chassis 24 through springs 35. Thus, the shoe 31 exerts on the strip 36 secured to the track an effort which, through a proper selection of the force of springs 33, 34 and 35, may be rendered proportional to the sum of the weights of the chassis and body, irrespective of the load carried by the vehicle. The strips 36 are provided wherever the linear motor may be expected to slow down the vehicle, notably when pulling in at stations or running downhill. These strips may also be provided in the stations in order to bring the vehicle to a complete standstill when it travels at a speed lower than the speed of the sliding field obtained from a number of successive coils connected to a common phase which is reduced to unity. In fact, in addition to constitute the simplest means for producing a deceleration independent of load, this system is advantageous in that it permits of systematically checking the proper operation of the emergency brake; in case of faulty operation, the vehicle will overstep its normal stopping position but the arrangement is such that the installation will be stopped automatically. Each vehicle may carry several armature sections each adapted to actuate one or several emergency brakes, thus improving considerably the safety of the system; therefore, a public transportation system may be contemplated which would operate in a fully automatic manner.

Although a typical and single form of embodiment of this invention has been shown and described herein, it will readily occur to those conversant with the art that many modifications and variations may be brought thereto without departing from the basic principles of the invention as set forth in the appended claims.

What I claim is:

1. Linear motor for a guided transport installation, notably for a public transportation system on rails, with vehicles moving on a track and applied from a multiphase current wiring system, comprising a fixed inductor, mounting means for fastening said inductor upon a track, said inductor comprising a prismatic magnetic core extending along the track and annular coils having the same cross-sectional contour as said core and surrounding said core and connected to the phases of a multiphase current wiring system for creating a sliding field to drive a vehicle, and an armature and means mounting same on said vehicle and said armature comprising a sleeve having a substantially U-shaped cross-sectional contour for surrounding said inductor and comprises throughout its length means defining an aperture for permitting the passage of said mounting means for fastening said inductor, said armature comprising a flux return yoke having a substantially U-shaped cross-sectional contour, a conductive layer disposed on the inner surface of said yoke defining the seat of the induced current, said layer being thicker on the side of said aperture to permit the closing of the current loops from pole to pole.

2. Linear motor according to claim 1, wherein the increase in the number of successive coils connected to the same phase of said multiphase current system creates a proportionally greater speed of the sliding field thereby increasing the speed of said vehicle.

3. Linear motor according to claim 1, designed for a single-track system, wherein said inductor comprises a single-phase winding for accelerating said vehicle when travelling in one direction and decelerating said vehicle when travelling in the other direction.

4. Linear motor according to claim 1, wherein the cross-sectional contour of said magnetic core has a substantially rectangular configuration with the major sides extending in the horizontal direction, and wherein said mounting means mounts the assembly of said inductor slightly shifted on the side of the aperture of the U-shaped armature along curved track sections.

5. Linear motor according to claim 1, wherein said mounting means comprises a plate of non-magnetic, electrically conducting metal which registers with the aperture of the armature sleeve so as to close said aperture and means defining a clearance necessary to permit movement of said armature.

6. Linear motor according to claim 1, wherein said inductor comprising a stacked magnetic plate consisting of U-shaped rings which are disposed between the field coils of said inductor.

7. Linear motor according to claim 6, wherein said stacked magnetic plates disposed between said field coils are of slightly greater area in cross-section than said coils, and, have on at least the major sides of their periphery, bent edges diverging from one another for distributing the magnetic flux in the gap.

8. Linear motor according to claim 1, wherein said armature comprises U-shaped magnetic strips disposed in planes substantially perpendicular in relation to the armature axis and disposed on the inner surface of said flux return yoke, longitudinal conducting strips extending on either side along the aperture of the U-shaped armature and disposed on the inner surface of said flux return yoke and conductors located between said U-shaped magnetic strips disposed on the inner surface of said flux return yoke and having their ends connected to said longitudinal conducting strips.

9. Linear motor according to claim 1, wherein said means mounting said armature comprises means for mounting said armature for longitudinal sliding movement in relation to the chassis of said vehicle comprising a resilient damping means fixedly mounted to the chassis of said vehicle for damping the movement of said armature, at least one brake shoe mounted on said chassis, means urging said brake shoe towards the track, fixed strips disposed along said track and control means coacting with said brake shoe and said armature when no force of inertia is exerted on said armature thereby effecting the brake shoe to engage said fixed strips disposed along track action to limit or reduce the speed of said vehicle.

10. Linear motor according to claim 9, wherein said control means comprises a cam mounted on said armature, and a pivoting lever having means mounting said brake shoe at one end and coacting with said cam at the other end, whereby the resumption of the condition of equilibrium of said armature in the absence of any electromagnetic effort permits the downward movement of said brake shoe so as to cause said means urging said brake shoe to press said shoe against said strip on the track the force of said means urging said brake shoe defined to produce a braking effort proportional to the weight and therefore the load of the vehicle.

11. The combination: a guided transport system comprising a driveable vehicle and guide means for guiding said vehicle; a linear motor for driving said vehicle along said guide means comprising a plurality of sets of field windings each set receptive of multiphase current applied thereto and mounted at selected locations along said guide means and comprising a magnetic core and a plurality annular coils each surrounding said core and having the same cross-sectional contour as said core and each receptive of a phase of said multiphase current, an armature comprising a plurality of magnetic strips having a substantially U-shaped cross-section for covering a plurality of field windings on three sides thereof and means for mounting said armature on said vehicle for coaction with each set of windings to induce a magnetic field having a strength proportional to the number of successive windings in each set of windings connected to the same phase.

12. In combination according to claim 11, wherein said field windings comprise single phase windings usable for accelerating said vehicle when travelling in one direction and decelerating said vehicle when travelling in the other direction along said guide means.

13. In combination according to claim 11, wherein said means for mounting said armature on said vehicle comprises means for slidably mounting said armature relative to said vehicle and damping means for damping the movement of said armature relative to said vehicle.

14. In combination according to claim 13, further comprising brake means coactive with said means for mounting said armature for reducing the speed of said vehicle when actuated including braking members disposed at selected locations along said guide means, at least one brake shoe, means mounting said brake shoe on said vehicle for contacting said braking members whenever said brake means is actuated and control means for actuating said brake means comprising a cam fixedly mounted on said armature and a pivotable lever having one end portion connected to said brake shoe and another end portion coacting with said cam to define one position of said lever whenever the rate of speed of said vehicle is less than a predetermined value thereby actuating said brake means and to define a second position of said lever whenever the rate of speed of said vehicle is not less than said predetermined value thereby deactuating said brake means.

15. The combination: a guided transport system comprising a driveable vehicle and guide means for guiding said vehicle; a linear motor for driving said vehicle along said guide means comprising a plurality of sets of field windings each set receptive of multiphase current applied thereto and mounted at selected locations along said guide means, an armature means for mounting said armature on said vehicle for coaction with each set of windings to induce a magnetic field having a strength porportional to the number of successive windings in each of windings connected to the same phase, said means for mounting said armature on said vehicle comprises means for slidably mounting said armature relative to said vehicle and damping means for damping the movement of said armature relative to said vehicle, and brake means coactive with said means for mounting said armature for reducing the speed of said vehicle when actuated including braking members disposed at selected locations along said guide means, at least one brake shoe, means mounting said brake shoe on said vehicle for contacting said braking members whenever said brake means is actuated and control means for actuating said brake means comprising a cam fixedly mounted on said armature and a pivotable lever having one end portion connected to said brake shoe and another end portion coacting with said cam to define one position of said lever whenever the rate of speed of said vehicle is less than a predetermined value thereby actuating said brake means and to define a second position of said lever whenever the rate of speed of said vehicle is not less than said predetermined value thereby deactuating said brake means.

* * * * *